United States Patent Office 2,802,674
Patented Aug. 13, 1957

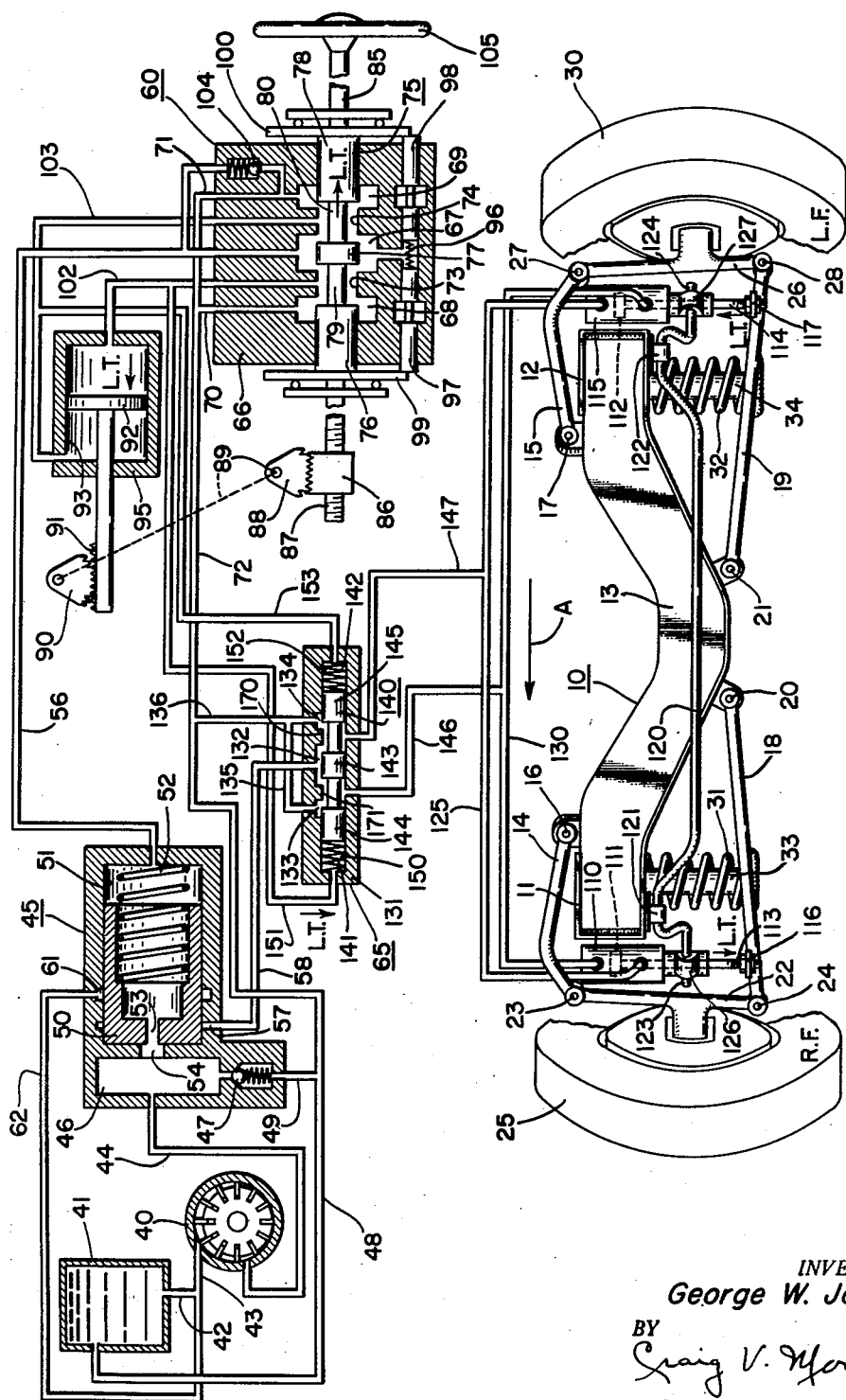

2,802,674
ROLL CONTROL SYSTEM FOR A MOTOR VEHICLE

George W. Jackson, Dayton, Ohio, assignor to General Motors Corporation, Detroit, Mich., a corporation of Delaware Application November 16, 1955, Serial No. 547,113

10 Claims. (Cl. 280—112)

This invention relates to a control system for a motor vehicle adapted to counteract transverse roll of the sprung mass of the vehicle relative to the unsprung mass when the vehicle is caused to deviate from a straight line course. It is well known that when a motor vehicle travels around a curve that the body of the vehicle, that is the sprung mass, tends to continue in a straight line course while the unsprung mass, that is, the wheels of the vehicle tend to pull the vehicle around the curve resulting in a roll of the body in a direction opposite to the direction of turn.

It is an object of this invention to provide a hydraulically actuated and controlled system to resist the roll of the sprung mass relative to the unsprung mass of the vehicle.

It is another object of the invention to provide a motor vehicle with a stabilizer bar extending transversely of the vehicle and mounted to the sprung mass with hydraulically operated and controlled extensible and contractable members connecting opposite ends of the stabilizer bar with the unsprung mass on opposite sides of the vehicle in a manner that the stabilizer bar is placed in torsion by the action of the hydraulically operated members to resist roll of the sprung mass relative to the unsprung mass when the vehicle is effecting a turn.

It is another object of the invention to provide apparatus in accordance with the foregoing objects wherein the hydraulically operated contractable and extensible members are connected with a power steering control system for the vehicle to receive fluid for actuation from the power steering control system and to effect operation of the hydraulically operated members selectively in response to the direction of turn effected through the power steering control system.

It is still another object of the invention to provide apparatus in accordance with the foregoing object wherein the hydraulically operated contractable and extensible members receive fluid from the power steering control system as subservient members to the power steering control system which at all times takes precedence over the operation of the hydraulically operated members in the roll control system.

Still another object of the invention is to provide apparatus for producing the results of the foregoing objects wherein the only fluid that is used from the power steering control system is that fluid which is delivered to a pilot flow control valve that controls flow of hydraulic fluid under pressure from the hydraulic fluid pressure source of the power steering control system to the hydraulically operated roll control system under conditions such that the hydraulic fluid under pressure will be supplied to the subservient roll control system only if more than a predetermined minimum volume flow from the fluid pressure source is delivered to the power steering control system irrespective of operation of the pilot regulating valve calling for delivery of fluid under pressure to the roll control system.

Further objects and advantages of the present invention will be apparent from the following description, reference being had to the accompanying drawings wherein a preferred form of the invention is clearly shown.

In the drawings:

In the single figure of drawings there is disclosed a hydraulically operated roll control system to resist transverse rolling movement of the sprung mass of a vehicle relative to the unsprung mass when the vehicle negotiates a turn, the roll control system being operably connected with a hydraulically operated power steering control system in a manner that the roll control system is at all times subservient to operation of the power steering control system.

In the drawing there is illustrated a motor vehicle 10 comprising side frame chassis members 11 and 12 that are connected together by means of a transversely extending cross frame member 13. In the drawing the front end suspension of a motor vehicle is illustrated.

The suspension for the motor vehicle comprises the upper control arms 14 and 15 pivotally mounted on the cross frame member 13 by means of pivot mountings 16 and 17. Lower control arms 18 and 19 are pivotally mounted on the cross frame member 13 by means of the pivot mountings 20 and 21. The free ends of the control arms 14 and 18 are connected with opposite ends of a steering arm 22 by means of pivot joints 23 and 24 whereby to support the vehicle wheel 25. Similarly the free ends of control arms 15 and 19 are connected with a steering control arm 26 by means of pivot connections 27 and 28 whereby to support a vehicle wheel 30.

A resilient coil spring 31 is placed between the lower control arm 18 and the cross frame 13. Similarly a coil spring 32 is placed between the lower control arm 19 and the cross frame 13. The springs 31 and 32 provide for resilient suspension of the sprung mass of the vehicle, that is the chassis frame and the body relative to the unsprung mass, that is the wheels. Shock absorber members 33 and 34 are also provided between the control arms 18 and 19 and the cross frame 13 whereby to dampen relative movements between the sprung mass and the unsprung mass of the vehicle. The shock absorbers 33 and 34 may be of the conventional hydraulic direct acting type, such as disclosed in the patent to Mearick Funkhouser 2,655,233 dated Oct. 13, 1953, and further description thereof is deemed unnecessary.

The motor vehicle is also provided with a power steering system that includes a hydraulic fluid pressure source, or pump 40 that delivers fluid under pressure to a fluid volume flow responsive valve 45. The pump 40 may be a conventional vane type pump that receives fluid from a reservoir 41 through the pipe lines 42 and 43 and delivers hydraulic fluid under pressure into the pressure discharge line 44. Hydraulic fluid under pressure is delivered from the discharge line 44 into a chamber 46 provided in the flow responsive valve 45. A pressure relief valve 47 connects with the chamber 46 to allow for exhaust of fluid from the chamber 46 into the return lines 49 and 48 that connect with the reservoir 41, the pressure relief valve 47 opening only in the event of fluid pressure rise above a predetermined value in the discharge line 44 from the pump 40.

The fluid volume liquid flow responsive valve 45 is provided with a piston 50 slidable in a cylinder bore 51. A compression spring 52 urges the piston 50 toward one end of the cylinder bore 51 as illustrated in the drawing. The piston 50 has a flow passage 53 that connects with a larger flow passage 54 in the wall of the chamber 46 so that fluid under pressure may be delivered from the pump 40 through the flow passages 54 and 53 into the hollow interior of the piston 50 and thence into the supply line 56 that connects with the steering control valve 60.

The flow passage 53 in the piston 50 is of a calibrated size to provide for a predetermined minimum volume flow of hydraulic fluid into the supply line 56 for supply to the steering control valve 60. When the pump 40 delivers fluid under pressure in excess of the predetermined minimum volume flow that is required for supplying the steering control valve 60, the piston 50 will be moved in a right hand direction against the action of the spring 52 to open a discharge port 57 that connects with a supply line 58 to supply fluid under pressure to a pilot regulating valve 65 more fully described hereinafter. Further, if the volume of hydraulic liquid discharged from the pump 40 continues to increase, such as when the motor vehicle is operating at high speed, the piston 50 will be moved still further in a right hand direction against action of the spring 52 to open a discharge port 61 that connects with a return line 62 for returning the excess hydraulic fluid to the inlet of the pump and the reservoir 41.

The steering control valve 60 consists of a valve body 66 that has a central fluid pressure inlet chamber 67 and two exhaust chambers 68 and 69. The inlet chamber 67 connects with the fluid pressure inlet line 56 while the exhaust chambers 68 and 69 are provided with exhaust lines 70 and 71 that connect with a fluid return line 72 that in turn connects with the return line 48 for returning fluid to the reservoir 41.

The inlet chamber 67 is connected with the exhaust chambers 68 and 69 by means of the bores 73 and 74 that are adapted to receive a valve control spool 75 that has the three land areas 76, 77 and 78 and the two undercut areas 79 and 80. The control spool 75 is carried on the steering shaft 85 that has the ball nut 86 and worm 87 on the end thereof. The ball nut 86 engages a gear segment 88 that is carried on the pitman shaft 89 that in turn also carries a gear segment 90 that engages a rack 91 connected with a piston 92 reciprocable in the cylinder bore 93 of a hydraulically operated power means or cylinder 95.

When power steering is not required, the spool 75 of the valve 60 is in the position illustrated in the drawing so that flow of fluid under pressure supplied through the line 56 into the chamber 67 will pass through the bores 73 and 74 into the exhaust lines 70 and 71 for return to the reservoir 41. The centering spring 96 and the plungers 97 and 98 bearing on the thrust bearings 99 and 100 normally retain the spool 75 in the position illustrated in the drawing when power steering action is not required. A steering control valve 60 is connected with the power means or power cylinder 95 by means of the supply line 102 or 103 whereby to supply fluid under pressure to opposite ends of the cylinder bore 93 on opposite sides of the piston 92 to effect power reciprocation of the piston 92 and thereby power actuation of the steering pitman shaft 89.

When the steering wheel 105 is turned, as for example to make a left turn of the vehicle, movement of the ball nut 86 is opposed by the force necessary to turn the wheels 25 and 30 of the vehicle, consequently the worm shaft 87 tends to move endwise through the ball nut 86. The ball nut and worm shaft act like a screw jack to thrust a rod against one thrust bearing, tending to move the bearing. However, movement of the thrust bearing, and the worm shaft is opposed by the centering plungers 97 and 98 and the centering spring 96 until the thrust rod exceeds a predetermined value, after which the valve control spool 75 will be moved in one direction or the other depending upon the direction of rotation of the steering wheel 105. For a left turn of the vehicle, the reaction is such as to cause the valve spool 75 to move in a right hand direction whereby the land 77 is moved into the bore 74 to cut off flow of fluid under pressure into the supply line 103 for the power cylinder 95. Thus fluid under pressure is supplied through the bore 73 into the supply line 102 for the power cylinder 95. Concurrently the exhaust line 70 from the chamber 68 is closed by the land 76 entering the bore 73.

Fluid under pressure will thus enter the cylinder bore 93 on the right hand side of the piston 92 to effect movement of the piston. Similarly, when a right hand turn is to be made, the valve spool 75 will move in a left hand direction whereby to supply fluid under pressure to the power cylinder 95 through the line 103 with the return line 71 being closed off at this time. The valve 104 is provided in the steering control valve to provide for internal fluid circulation in the valve on failure of the fluid pump so that direct manual steering can be occasioned without hydraulic lock in the hydraulic system.

The steering control system heretofore described provides hydraulic fluid under pressure to effect operation of a roll control system for the vehicle.

The roll control system for the vehicle comprises a pair of hydraulic cylinders 110 and 115. Each of the cylinders 110 and 115 has a piston 111 and 112 therein for reciprocation within the cylinder bore, the pistons 111 and 112 having plunger rods 113 and 114 extending outside the cylinders 110 and 115 and connected to the lower control arms 18 and 19 respectively by the connecting members 116 and 117.

A stabilizer bar 120 is carried in the rubber mounting blocks 121 and 122 supported on the side frame members 11 and 12 of the chassis. The stabilizing bar 120 is that which is conventionally provided upon motor vehicles to resist body swing relative to the wheels of the vehicle when traversing a curve. Opposite ends 123 and 124 of the stabilizer bar 120 are disposed within fittings 126 and 127 carried on the cylinders 110 and 115 respectively and immovably secured thereto for movement therewith. The roll control cylinders 110 and 115 have the fluid pressure supply lines 125 and 130 connected to the cylinders on opposite sides of the pistons 111 and 112 whereby fluid under pressure can be supplied to the cylinder chamber either above or below the pistons 111 and 112 under control of the flow regulating valve 65, as hereinafter described. It will be noted that the supply line 130 connects with the cylinder 110 above the piston 111 therein while connecting with the cylinder 115 below its piston 112. Similarly the supply line 125 is connected with the cylinder 115 above the piston 112 while being connected with the cylinder 110 below its piston 111. The cross connection thus provided permits delivery of fluid under pressure simultaneously to the top side of one cylinder and the bottom side of the other.

The stabilizer bar 120 and the roll control cylinders 110 and 115 are illustrated in the position normally attained when the vehicle is standing still.

The regulating valve 65 controls flow of fluid under pressure to the supply lines 125 and 130 that connect with the roll control cylinders 110 and 115. The regulating valve 65 comprises a body 131 having a central inlet chamber 132 connected with the pressure line 58 that receives fluid under pressure from the liquid volume flow responsive valve 45. The valve 65 is also provided with two exhaust chambers 133 and 134 that are connected by the lines 135 and 136 with the return line 72 that connects with the reservoir 41.

A valve control spool 140 is provided in the valve 65 and is normally retained in the position illustrated in the drawing by the centering springs 141 and 142 with the land portion 143 disposed centrally in the chamber 132 and the land portions 144 and 145 disposed with the ends in the chambers 133 and 134 to allow for fluid under pressure to circulate from the inlet line 58 through the exhaust lines 135 and 136.

Fluid supply lines 146 and 147 connect the valve 65 on opposite sides of the land area 143 with the supply lines 130 and 125 respectively.

The regulating or pilot valve 65 is actuated by hydraulic fluid received from the steering control valve 60, the chamber 150 containing the centering spring 141 being connected by means of a line 151 with the supply line 102 that connects the steering control valve 60 with one side of the power means or cylinder 95. Similarly, the chamber 152 that contains the centering spring 142 is connected by means of a line 153 with the supply line 103 that connects the steering control valve 60 with the opposite end of the cylinder or power means 95. Thus it will be seen that fluid under pressure will be supplied to the chamber 150 or 152 of the regulating valve 65 selectively according to which of the supply lines 102 and 103 receive fluid under pressure according to the direction of rotation of the steering wheel 105.

When a left turn is effected by the power steering control mechanism in the manner heretofore described, fluid under pressure is supplied through the line 102 to the power cylinder 95. Concurrently a small amount of fluid under pressure is delivered through the line 151 into the chamber 150 of the pilot regulating valve 65 thereby causing the valve spool 145 to shift in a right hand direction to cause the land 143 to enter the valve bore 170 and the land portion 144 to enter the valve bore 171 whereby to permit fluid under pressure supplied through the line 58 to enter the line 146 for delivery into the supply line 130 for the roll control cylinders 110 and 115 whereby fluid under pressure is supplied into the cylinder chamber above the piston 111 and cylinder 110 and below the piston 112 in the cylinder 115. During the course of a left turn movement, the body swing of the vehicle is in the direction of the arrow A, the vehicle suspension being viewed as from the front of the vehicle. Thus, with the body swing being in the direction of the arrow A, the suspension spring 31 will tend to be compressed whereas the suspension spring 32 will expand, of course under control of the shock absorbers 33 and 34. Compression of the spring 31 will effect downward movement of the frame adjacent the cylinder 110 and its connecting rod 113 thereby causing the the end 123 of the stabilizer bar 120 to move upwardly relative to the frame since the arm 18 attached to the wheel 25 cannot move downwardly with the wheel engaging the ground. Concurrently expansion of the spring 32 permits upward movement of the frame adjacent the cylinder 115 and its connecting rod 114 with resulting torque in the rod 120 opposite to that effected on the opposite end of the rod. This is the normal reaction obtained on a motor vehicle using a conventional stabilizer bar and to this extent the stabilizer bar 120 acts in the normal manner when the opposite ends are moved in the direction stated with the torque created in the bar 120 resisting the body swing of the vehicle.

However, it has not heretofore been possible to provide a sufficiently stiff stabilizer bar to resist all body swing for the reason that a stabilizer bar having sufficient stiffness to do this will create a hard riding condition. Thus the currently used stabilizer bars are a compromise between sufficient stiffness to resist all body swing and that just sufficient to aid in resisting the body swing movement without causing hard riding conditions.

In this invention however during the course of the turning movement of the vehicle additional torque is applied in the stabilizer bar 120. This is occasioned through the supply of the hydraulic fluid to the upper side of the roll control cylinder 110 and the lower side of the roll control cylinder 115.

With the body swing in the direction of the arrow A, and with the cylinder 110 moving upwardly relative to the frame to move the end 123 of the stabilizer bar upwardly additional torque effort can be placed in the stabilizer bar by the addition of fluid under pressure into the upper end of the cylinder 110 above the piston 111 to effect extension movement of the plunger 113 out of the cylinder 110 thereby increasing the upward force on the end 123 of the stabilizer bar 120 to offset compression of the spring 31. Similarly, with the spring 32 expanding with the body swing in the direction of the arrow A, the cylinder 115 tends to move downwardly with the arm 19. However, with fluid under pressure being applied to the lower end of cylinder 115 below the piston 112 this downward movement of the cylinder with the plunger being pulled upwardly causes additional downward force on the end 124 of the stabilizer bar 120. The additional upward force applied to the end 123 of the stabilizer bar and the additional downward force applied to the end 124 of the bar creates additional torque in the stabilizer bar to resist the body swing movement.

Since the steering control valve 60 applys fluid under pressure to the power cylinder 95 in direct proportion to the power effort required to traverse the curve under negotiation, the fluid supplied to the pilot regulating valve 65 will permit it to follow the power curve effected by the steering control valve 60 which in turn will apply fluid under pressure to the roll control cylinders 110 and 115 in direct proportion to the roll or body swing effected during the course of negotiating the turn.

It will of course be understood that during the course of a right hand turn of the vehicle exactly the same result will be obtained but under reverse operating conditions.

The foregoing result of the control of roll of the vehicle will be obtained under regulation of the steering control valve 60 so long as the supply of fluid under pressure from the pump is greater than the volume flow allowed through the flow control passage 53 of the flow responsive valve 45, for under these conditions the piston 50 will be moved toward a right hand position to open the port 57 to provide for the flow of fluid under pressure through the pilot regulating valve 65. On the other hand at any time the pump discharges a volume of fluid under pressure that is less than the volume allowed to flow through the flow control passage 53, which volume is the minimum allowable for control in the power steering system the piston 50 will move to the left hand position illustrated in the drawings to cut off flow of fluid under pressure to the regulating valve 65 and thereby to roll control cylinders 110 and 115. The system is thus one that gives absolute precedence to the operation of the power steering control system over the roll control system.

In the foregoing description the stabilizing system has included the two roll control cylinders 110 and 115 that act oppositely on the stabilizing bar 120 to increase the torque in the bar. However, it will be appreciated that one of the cylinders 110 or 115 can be eliminated and a rigid link be provided between one end of the stabilizer bar 120 and the lower control arm 18 or 19 respectively. Under circumstances where the stroke of the roll control cylinder is the same as when two cylinders are used there will result a lesser increase in torque in the stabilizer bar when the single control cylinder is selectively actuated in accordance with the direction of turn of the vehicle. However the degree of increased torque applied to the stabilizer bar 120 is merely a result of the length of stroke of the piston within the roll control cylinder so that if a high degree of torque is desired into the stabilizer bar 120 the stroke of the piston within the cylinder can be increased accordingly when a single roll control cylinder is used in place of the two cylinders 110 and 115 as heretofore described.

While the form of embodiment of the invention as herein disclosed constitutes a preferred form, it is to be understood that other forms might be adopted as may come within the scope of the claims which follow.

What is claimed is as follows:

1. A control system on a vehicle to counteract transverse roll of the sprung mass relative to the unsprung mass when the vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, fluid actuated means operably connected with the respective spring means to oppose extension or compression of the spring means on rising or lowering movement respectively of the sprung mass relative to the unsprung mass, regulating valve means controlling flow of pressure fluid from said source to said fluid actuated spring opposing means operably connected therewith in parallel circuit flow relationship to said steering control valve means to effect when activated opposing action by the said opposing means on the said spring means on opposite sides of the vehicle, said regulating valve means including fluid actuated control means to actuate the same operably connected with said steering control valve means for actuation by fluid pressure flow from the steering control valve means to the power means to actuate said regulating valve means concurrently and effect supply of fluid from said source to said spring opposing means selectively in accordance with the direction of turn of the vehicle from a straight line course and in direct proportion to the power steering effort to oppose roll of the sprung mass opposite to the direction of turn of the vehicle in direct proportion to the power steering effort effecting the turn.

2. A control system on a vehicle to counteract transverse roll of the sprung mass relative to the unsprung mass when the vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, fluid actuated means operably connected with the respective spring means to oppose extension or compression of the spring means on rising or lowering movement respectively of the sprung mass relative to the unsprung mass, regulating valve means controlling flow of pressure fluid from said source to said fluid actuated spring opposing means operably connected therewith to effect when activated opposing action by the said opposing means on the said spring means on opposite sides of the vehicle, said regulating valve means including fluid actuated control means to actuate the same operably connected with said steering control valve means for actuation by fluid pressure flow from the steering control valve means to the power means to actuate said regulating valve means concurrently and effect supply of fluid from said source to said spring opposing means selectively in accordance with the direction of turn of the vehicle from a straight line course to oppose roll of the sprung mass opposite to the direction of turn of the vehicle, and other valve means responsive to volume flow of pressure fluid from said source to said regulating valve means.

3. A control system on a vehicle to counteract transverse roll of the sprung mass relative to the unsprung mass when the vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, fluid actuated means operably connected with the respective spring means to oppose extension or compression of the spring means on rising or lowering movement respectively of the sprung mass relative to the unsprung mass, regulating valve means controlling flow of pressure fluid from said source to said fluid actuated spring opposing means operably connected therewith to effect when activated opposing action by the said opposing means on the said spring means on opposite sides of the vehicle, said regulating valve means including fluid actuated control means to actuate the same operably connected with said steering control valve means for actuation by fluid pressure flow from the steering control valve means to the power means to actuate said regulating valve means concurrently and effect supply of fluid from said source to said spring opposing means selectively in accordance with the direction of turn of the vehicle from a straight line course to oppose roll of the sprung mass opposite to the direction of turn of the vehicle, and other valve means responsive to volume flow of pressure fluid from said source to said steering control valve to maintain pressure fluid flow to said steering control valve in precedence over said regulating valve means so long as the fluid flow from the pressure source to said steering control valve is at or below a predetermined minimum volume.

4. A control system on a vehicle to counteract transverse roll of the sprung mass relative to the unsprung mass when the vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, fluid actuated means operably connected with the respective spring means to oppose extension or compression of the spring means on rising or lowering movement respectively of the sprung mass relative to the unsprung mass, regulating valve means controlling flow of pressure fluid from said source to said fluid actuated spring opposing means operably connected therewith to effect when activated opposing action by the said opposing means on the said spring means on opposite sides of the vehicle, said regulating valve means including fluid actuated control means to actuate the same operably connected with said steering control valve means for actuation by fluid pressure flow from the steering control valve means to the power means to actuate said regulating valve means concurrently and effect supply of fluid from said source to said spring opposing means selectively in accordance with the direction of turn of the vehicle from a straight line course to oppose roll of the sprung mass opposite to the direction of turn of the vehicle, and other valve means responsive to volume flow of pressure fluid from said source to said steering control valve to effect cut off of pressure fluid from said source to said regulating valve means whenever the fluid volume flow to said steering control valve is below a predetermined minimum volume.

5. A control system on a vehicle to counteract transverse roll of the sprung mass relative to the unsprung mass when a vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, fluid actuated means comprising double acting piston and cylinder means operably connected with each of the spring means on opposite sides of the vehicle and cross connected to oppositely oppose extension or compression of the spring means on opposite sides of the vehicle, regulating valve means having two selective positions directing flow of pressure fluid to said piston and cylinder means oppositely on selective positioning thereof and including operating means effective to position said valve means in the said positions selectively, said operating means having fluid connection with said steering control valve and actuated by a pressure fluid flow from the steering control valve to said power means to dispose said regulating valve means in one position or the other according to the power steering direction effected by pressure fluid flow from the steering control valve to the power means, and other fluid flow responsive valve means responsive to volume flow of pressure fluid from said source to said power steering control valve having one position effected by said volume flow above a predetermined minimum volume to provide for supply of pressure fluid from said source to said regulating valve means and a second position effected by volume flow below the said predetermined minimum volume to prevent said supply of fluid to said regulating valve means whereby to provide for precedence of pressure fluid flow to said steering control valve means.

6. Apparatus in accordance with claim 5 in which the said operating means for the said regulating valve means is responsive to the pressure of the fluid delivered from the said steering control valve to the said power means to effect actuation of the regulating valve means to supply pressure fluid to said piston and cylinder means in direct proportion to the pressure of the fluid supplied by the steering control valve to the power means.

7. Apparatus in accordance with claim 5 in which the spring means includes a stabilizer bar carried on the sprung mass with opposite ends of the bar connected to the unsprung mass on opposite sides of the vehicle with the said piston and cylinder means providing extensible and contractable connecting links between the unsprung mass and the said ends of the stabilizer bar to effect thereby torsion on the bar under control of the said regulating valve means.

8. A control system on a vehicle to counteract transverse roll of the sprung mass relative to the unsprung mass when the vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, a stabilizer bar carried on said sprung mass, fluid actuated means carried at each side of said sprung mass and providing an extensible and contractable link between opposite ends of said stabilizer bar and the unsprung mass thereadjacent, regulating valve means controlling flow of pressure fluid from said source to each of said fluid actuated means to effect extension or contraction thereof in opposition to said spring means, said regulating valve means including fluid actuated control means to actuate the same and operably connected with said steering control valve means for actuation by fluid pressure flow from the steering control valve means to the power means whereby to actuate said regulating valve means concurrently therewith and effect supply of fluid from said source to the said fluid actuated means opposing said spring means selectively in accordance with the direction of turn of the vehicle from a straight line course to oppose roll of the sprung mass opposite to the direction of turn of the vehicle.

9. A control system on a vehicle to counteract transverse roll of the sprung mass relative to the unsprung mass when the vehicle turns from a straight line course, including in combination, fluid power steering control means including a fluid pressure source operably connected with fluid power means for activating the steering system of the vehicle through steering control valve means regulating flow of fluid from said pressure source to said power means, resiliently acting spring means at opposite sides of the vehicle supporting a sprung mass of the vehicle upon an unsprung mass thereof, a stabilizer bar carried on said sprung mass, link means extending between opposite ends of the stabilizer bar and the unsprung mass, at least one of said link means comprising a fluid actuated means providing an extensible and contractable link between the stabilizer bar and the unsprung mass, regulating valve means controlling flow of pressure fluid from said source to said fluid actuated means to effect extension or contraction thereof with resulting torque application on said stabilizer bar, said regulating valve means including fluid actuated control means to actuate the same and operably connected with said steering control valve means for actuation by fluid pressure flow from the steering control valve means to the power means whereby to actuate said regulating valve means concurrently therewith and effect supply of fluid from said source to said fluid actuated means to effect extension or contraction thereof selectively in accordance with the direction of turn of the vehicle to oppose roll of the sprung mass opposite to the direction of turn of the vehicle.

10. A control system on a vehicle to counteract transverse roll of the sprung mass relative to the unsprung mass when the vehicle turns from a straight line course, including in combination, fluid power steering control means including a fluid pressure source operably connected with fluid power means for actuating the steering system of the vehicle through steering control valve means regulating flow of fluid from said pressure source to said power means, resiliently acting spring means at opposite sides of the vehicle supporting a sprung mass of the vehicle upon an unsprung mass thereof, fluid actuated means operably connected with at least one of the spring means to oppose extension or compression of the spring means on rising or lowering movement respectively of the sprung mass relative to the unsprung mass, regulating valve means controlling flow of pressure fluid from said source to said fluid actuated spring opposing means operably connected therewith to effect when activated opposing action by the said opposing means on the said spring means, said regulating valve means including fluid actuated control means to actuate the same operably connected with said steering control valve means for actuation by fluid pressure flow from the steering control valve means to the power means to actuate said regulating valve means concurrently and effect supply of fluid from said source to said spring opposing means in accordance with the direction of turn of the vehicle selectively to oppose roll of the sprung mass opposite to the direction of turn of the vehicle.

References Cited in the file of this patent
UNITED STATES PATENTS

| | | |
|---|---|---|
| 2,735,691 | Carlson | Feb. 21, 1956 |
| 2,743,941 | Walker | May 1, 1956 |